United States Patent [19]

Kanai et al.

[11] 4,409,632
[45] Oct. 11, 1983

[54] MAGNETIC HEAD ARRANGEMENT

[75] Inventors: Kenji Kanai, Neyagawa; Nobuyuki Kaminaka, Moriguchi; Norimoto Nouchi, Katano; Noboru Nomura, Kyoto, all of Japan

[73] Assignee: Matsushita Electric Industrial Co., Ltd., Osaka, Japan

[21] Appl. No.: 208,480

[22] Filed: Nov. 19, 1980

[30] Foreign Application Priority Data

Nov. 20, 1979 [JP] Japan .............................. 54-151047

[51] Int. Cl.³ ........................... G11B 5/20; G11B 5/22
[52] U.S. Cl. ..................................... 360/123; 360/122
[58] Field of Search ................ 360/123, 122, 125–126, 360/127

[56] References Cited

U.S. PATENT DOCUMENTS 4,190,872  2/1980  Jones, Jr. et al. .................... 360/125
4,219,854  8/1980  Church et al. .................. 360/125 X
4,241,367  12/1980  Nomura et al. ................. 360/123 X
4,318,148  3/1982  Kaminaka et al. ............. 360/123 X Primary Examiner—John H. Wolff
Attorney, Agent, or Firm—Wenderoth, Lind & Ponack

[57] ABSTRACT

A magnetic head arrangement includes a spiral coil made of a thin layer and having a central opening. The spiral coil is deposited on a first layer of magnetic material in an electrically insulated manner. The arrangement further includes a second layer of magnetic material having a width wider than that of the central opening of the spiral coil and deposited on the spiral coil in an electrically insulated manner. A portion of the second layer located in the central opening of the spiral coil is magnetically connected with the first layer and another portion of the second layer located outside the spiral coil is held above the first layer to form a predetermined gap.

7 Claims, 8 Drawing Figures

MAGNETIC HEAD ARRANGEMENT

BACKGROUND OF THE INVENTION

The present invention relates to a magnetic head arrangement for use in recording and reproducing signals, and more particularly, to a magnetic head arrangement including a thin layer.

The technology of employing a thin layer for a magnetic head has greatly improved the accuracy of positioning the magnetic head and has made it possible to form the magnetic head compact in size, and eventually, has opened a new field for the magnetic head. One of the most outstanding features of this thin layer type magnetic head is that it is possible to align a plurality of magnetic head units on one substrate along a direction perpendicular to a plane of, and to the direction of movement of, a recording medium, such as, a magnetic tape or disc, and within the width of the recording medium to form a multitrack type magnetic head arrangement. When compared with the conventional magnetic head arrangement formed by a bulky material, more than ten times the number of magnetic head units can be formed.

Although there is the advantage mentioned above, the magnetic head arrangement formed by a thin layer has problems to be solved, one of which is to improve the density of magnetic force produced from each of the heads to a degree sufficient to record the tape without causing any interferences between the neighboring tracks aligned densely. For this purpose, the size of the winding of each magnetic head should be not larger than the width of the corresponding track. Since the thin layer type magnetic head has a plane structure, an increase of the number of the windings results in an increase of the area occupied by the magnetic head. Therefore, the number of windings is limited to a certain number and, therefore, it is difficult to increase the number of windings. To produce a sufficient magnetic field, the current fed through the coil is increased. Although, the pattern of the coil winding, maybe a multilayer pattern or a zig-zag pattern, such patterns are not appropriate from the view point of the size they occupy and the manufacturing process they require. Therefore, it is preferable to employ a spiral pattern for the coil winding. The spiral winding not only is simple in construction but also is reliable in operation.

FIGS. 1(a) and 1(b) show a prior art multitrack type magnetic head arrangement formed by a thin layer, in which FIG. 1(a) is a top plan view of the magnetic head arrangement and FIG. 1(b) is a cross-sectional view taken along a line I(b)-I(b) shown in FIG. 1(a). The prior art magnetic head arrangement includes a plurality of magnetic head units 9 aligned with a predetermined pitch P along a direction perpendicular or orthogonal to the direction of advance of the recording medium, each unit 9 having a spiral coil 4 formed by a thin layer of electrically conductive material. The spiral coil 4 is supported on an electrically insulating layer 2 deposited on a substrate 1 made of magnetic material, and has a center opening which is referred to as a window 3. The magnetic head unit 9 further has a strip of magnetic layer 8 which has a contacting portion 8a, intermediate portion 8b and a gap forming portion 8c. The contacting portion 8a is located within the window 3 for establishing a magnetic connection between the substrate 1 and the contacting portion 8a. For this purpose, a portion of the insulating layer 2 located in the window 3 of the coil 4 should preferably be removed to improve the magnetic connection between the contacting portion 8a and the substrate 1. The gap forming portion 8c is located adjacent to an edge 1a of the substrate 1 for forming a predetermined gap G at a position adjacent to a recording medium T. The intermediate portion 8b is positioned between the contacting portion 8a and gap forming portion 8c. In order to prevent any electrical connection between the windings of the spiral coil 4, a suitable insulating layer of filler is provided between the coil 4 and the magnetic layer 8. When an electrical current is fed through the spiral coil 4, it generates magnetic flux, as shown by dotted lines, that runs through a closed loop formed by magnetic layer 8, gap G and the substrate 1 for impressing a magnetic signal on the recording medium T by the magnetic flux that leak outwardly from the gap G towards the recording medium T.

According to the prior art magnetic head arrangement described above, the magnetic layer 8 has a width W1 approximately equal to the width W0 of the window 3 along its entire length. Accordingly, a ratio (W1/P) of the width W1 particularly at the gap forming portion 8c to the pitch P is very small, resulting in low percentage of utilization of the recording medium T. To overcome such a disadvantage, one may attempt to widen the width of the gap forming portion 8c to W2 as shown in FIG. 2. However, according to this structure, there occurs a disadvantage that the density of the magnetic flux, which is highest at an intermediate portion 8b adjacent to the contacting portion 8a, becomes low towards the gap forming portion 8c, resulting in low magnetic flux produced across the gap G, i.e., in low core efficiency.

Furthermore, according to the prior art magnetic head arrangement described above, the magnetic flux at the intermediate portion 8b adjacent to the contacting portion 8a may saturate, resulting in an insufficient transmission of magnetic motive forced produced by the current flowing through the spiral coil 4.

Moreover, according to the prior art magnetic head arrangement described above, some percentage of magnetic flux generated by the current flowing through the inner winding of the spiral coil 4 may leak out from the magnetic layer 8, so that the magnetic flux produced across the gap G will become low.

SUMMARY OF THE INVENTION

Accordingly, it is an important object of the present invention to provide a magnetic head arrangement of a thin layer type which can produce a high magnetic motive force towards the recording medium with high percentage of utilization of the recording medium.

It is also an important object of the present invention to provide a magnetic head arrangement of the above described type which can prevent the leakage of magnetic flux from the magnetic layer and, therefore, can effectively transmit the magnetic motive force to the gap forming portion.

In accomplishing these and other objects, a magnetic head according to the present invention comprises a first magnetic layer and an electrically conductive layer formed in a spiral slope with a central opening and deposited on the first magnetic layer in an electrically insulated manner. The magnetic head according to the present invention further comprises a second magnetic layer deposited on the electrically conductive layer in an electrically insulated manner. The second magnetic layer covers a portion of the electrically conductive layer over an area which is wider than the central opening of the electrically conductive layer. The second magnetic layer has a contacting portion located within the central opening of the electrically conductive layer for establishing a magnetic connection with the first magnetic layer, an intermediate portion located above a pair of the electrically conductive layers, and a gap forming portion located outside the electrically conductive layer for forming a predetermined gap between the gap forming portion and the first magnetic layer. The gap is adopted to confront the recording medium.

According to the preferred embodiment of the invention, a border line between the contacting portion and the intermediate portion is equal to or longer than the width of the gap forming portion that confronts the recording medium.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE INVENTION

Figure 1A:
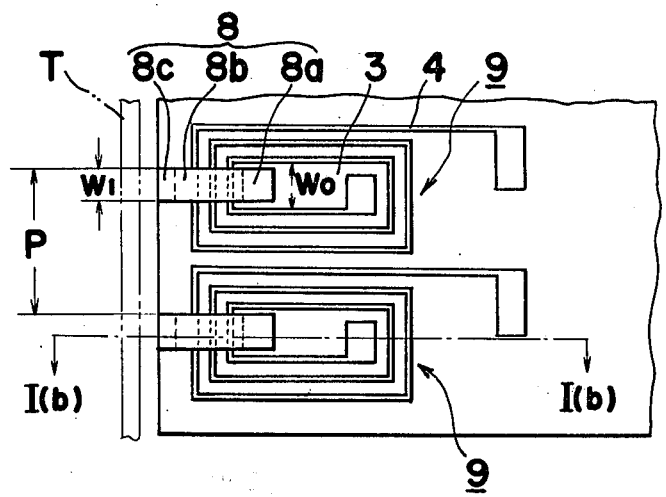
FIG. 1(a) is a top plan view of a magnetic head arrangement according to the prior art.
Figure 1B:
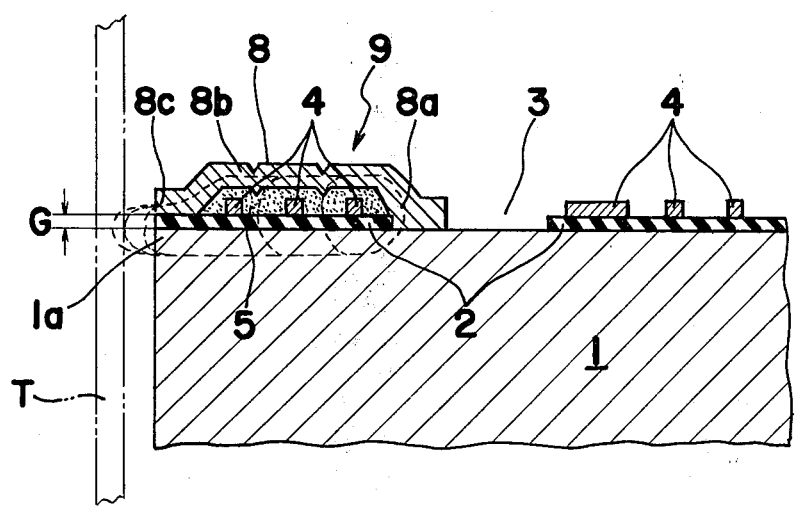
FIG. 1(b) is a cross-sectional view taken along a line I(b)—I(b) shown in FIG. 1(a)
Figure 2:
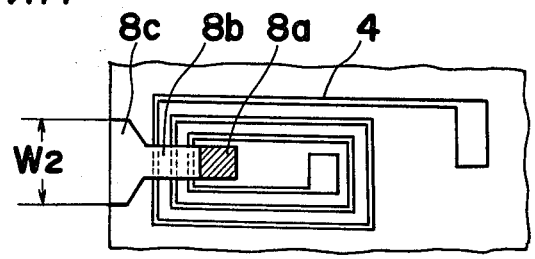
FIG. 2 is a top plan view of a magnetic head arrangement according to another prior art arrangement.
Figure 3:
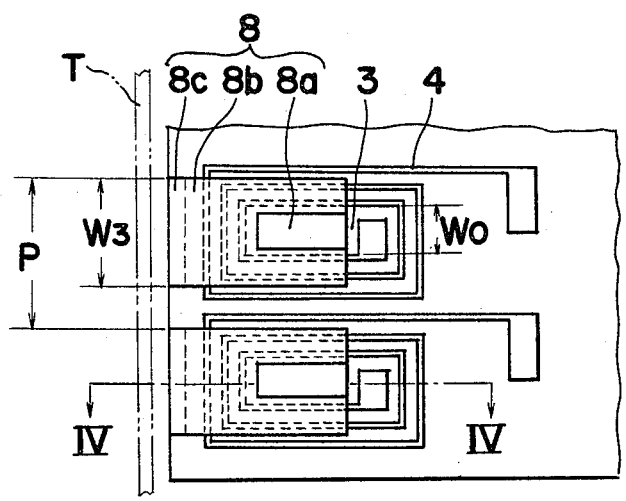
FIG. 3 is a top plan view of a magnetic head arrangement according to the present invention.
Figure 4:
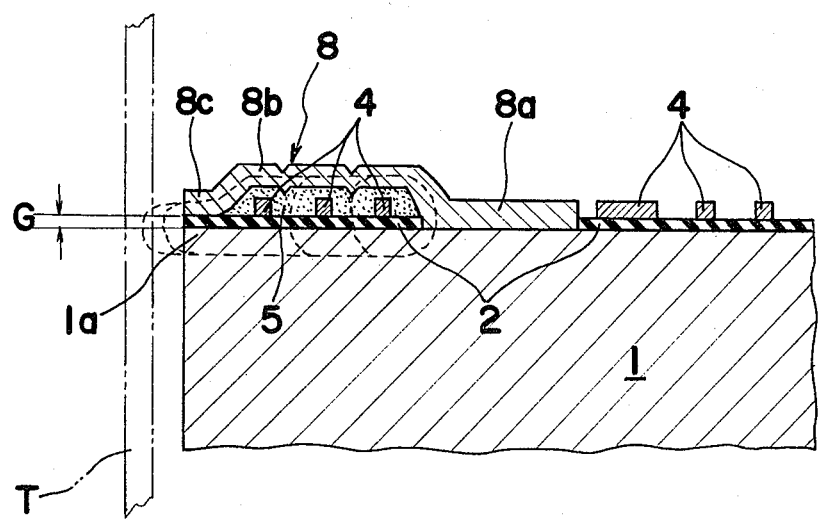
FIG. 4 is a cross-sectional view taken along a line IV—IV shown in FIG. 3.
Figure 5:
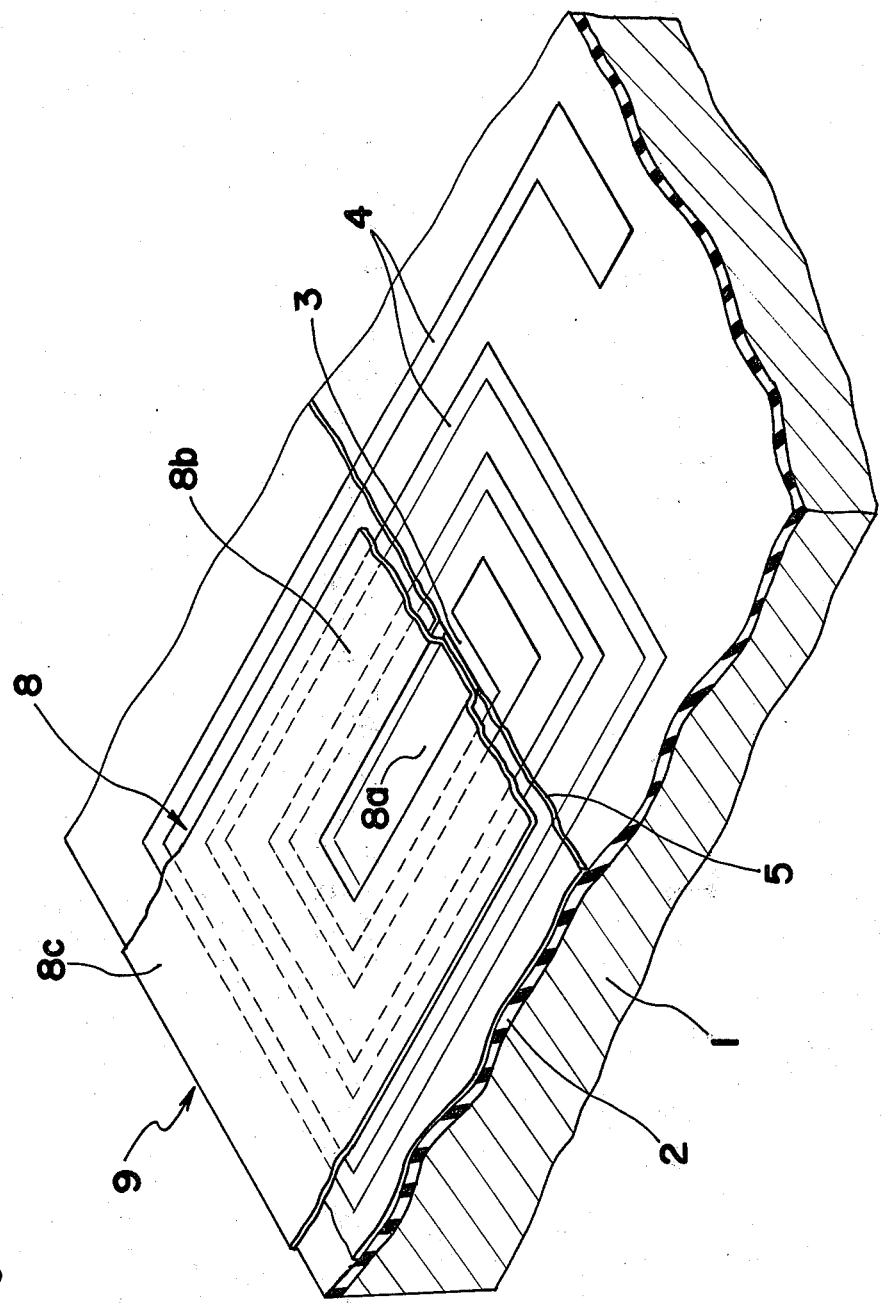
FIG. 5 is a perspective view of a magnetic head unit according to the present invention.

Referring to FIGS. 3, 4, 5 and 6, a magnetic head arrangement according to the present invention comprises a plurality of magnetic head units 9 aligned with a predetermined pitch P along a direction perpendicular or orthogonal to the direction of movement of a recording medium T, such as, a magnetic tape, disc or drum, and each unit 9 having, as best shown in FIG. 5, a substrate 1 made of magnetic material, an electrically insulating layer 2 deposited on a flat surface of the substrate 1 and a spiral coil 4 made of a thin layer and deposited in the insulating layer 2. A portion of the insulating layer 2 located within a central opening of the spiral coil 4 referred to as a window 3 should preferably be formed with an opening for establishing a good magnetic connection between the substrate 1 and a magnetic layer 8 which is deposited over the spiral coil 4 through a suitable electrically insulating layer 5. The magnetic layer 8 of a rectangular shape is constituted by a contacting portion 8a located in the opening formed in the insulating layer 2, an intermediate portion 8b extending from the contacting portion 8a and located above a part of the windings of the spiral coil 4, and a gap forming portion 8c extending from an edge of the intermediate portion 8b remote from the contacting portion 8a and located adjacent to an edge 1a (FIG. 4) of the substrate 1 to form a predetermined gap G between the gap forming portion 8c and the edge 1a of the substrate 1. According to a preferred embodiment, the substrate 1 and the magnetic layer 8 are made of metal alloy of Ni-Fe or Fe-Al-Si. When an electrical current is fed through the spiral coil 4, it generates magnetic flux, as shown by dotted lines in FIG. 4, that run through a closed loop formed by the magnetic layer 8, gap G and the substrate 1 for impressing a magnetic signal on the recording medium T by the magnetic flux that leaks outwardly from the gap G towards recording medium T.

According to the magnetic head arrangement of the present invention, the magnetic layer 8 has such a size that its width W3 (FIGS. 3 and 6) is greater than the width W0 of the window 3, the width B (FIG. 6) of its contacting portion 8a is smaller than the width W0 of the window 3, and the length E (FIG. 6) of the contacting portion 8a is greater than half the width W3 of the magnetic layer 8. Accordingly, the length of a border line (i.e. I+II+III) between the contacting portion 8a and the intermediate portion 8b is equal to or greater than the width W3, particularly the width of gap forming portion 8c. It is to be noted that the width W3 is approximately equal to the width of each track.

Figure 6:
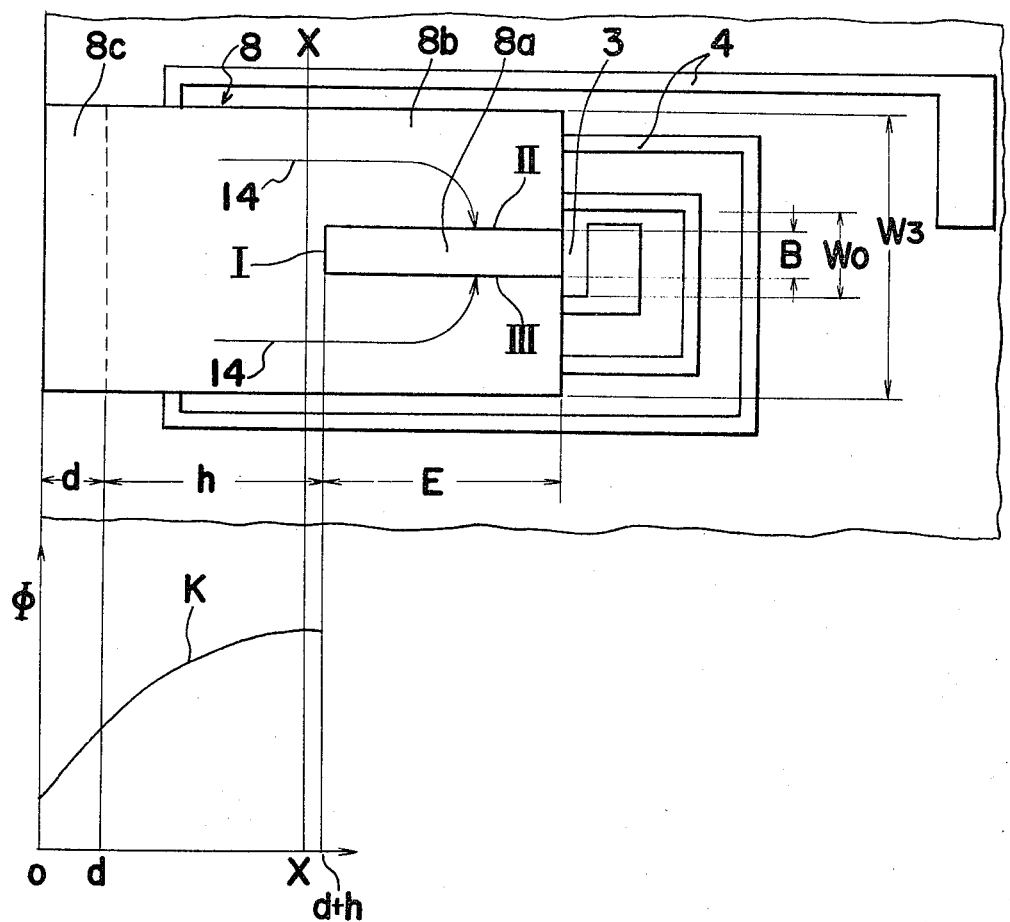
FIG. 6 is a top plan view of the magnetic head unit shown in FIG. 5, and also shows a magnetic flux intensity curve.

Next, the characteristics of the magnetic head of the present invention are explained. Generally, when a coil wound in spiral form is fed with a current, the magnetic flux generated thereby is densely distributed in the center of the coil and is gradually reduced outwardly towards the radial direction of the spiral coil. Accordingly, when the spiral coil 4 employed in the present invention is taken into consideration, the distribution K of magnetic flux along a line from the edge of the gap forming portion 8c to the edge of the contacting portion 8a located close to the gap forming portion 8c can be depicted as shown in FIG. 6, in which the abscissa and ordinate represent, respectively, distance and magnetic flux intensity, and d represents the depth of the gap G and h represents the distance between the gap forming portion 8c and the contacting portion 8a. As is understood from the curve K, the intensity of the magnetic flux is highest along a line X adjacent to the edge of the contacting portion 8a.

Since the magnetic layer 8 has the width W3 wider than the width W0 of the window 3, the magnetic flux lines that pass through the window 3 diverge of converge not only to the side I of the contacting portion 8a, but also to the sides II and III as shown by arrows 14. Furthermore, since sum of lengths of the sides I, II and III which can be expressed as 2E+B is equal to or greater than the width of the track, the intensity of magnetic flux that converges into the contacting portion 8a is approximately equal to that along the line X where the magnetic flux is most densely distributed. Accordingly, there will be no saturation of magnetic flux in the magnetic layer 8 along the line X, therefore, resulting in high magnetic motive force produced across the gap G.

Moreover, since the width W3 of the magnetic layer 8 is much wider than that of the prior art, the ratio W3/P designating the rate of utilization of the recording medium is much improved without causing any failure of magnetic flux transmission along the magnetic layer 8.

Furthermore, since the width B of the contacting portion 8a can be reduced to as small as twice the thickness of the magnetic layer 8, it is possible to reduce the width W0 of the window 3. Accordingly, it is possible to increase the number of turns of the spiral coil 4, resulting in and increase of magnetic flux generated by a unit current flowed through the spiral coil 4.

According to the magnetic head arrangement of the present invention, since the gap forming portion 8c has the width W3 much wider than that of the prior art, the track formed thereby also has a considerably large width. Accordingly, even if the recording medium, during its movement, makes a waving motion in a direction of alignment of the magnetic head units 9, the gap forming portion 8c can cover the corresponding track to reproduce or record the signal without failure. This is advantageous particularly when carrying out recording or reproducing of signals on a large number of tracks with each track requiring a wide space on a recording medium of magnetic tape.

It is to be noted that the portion of the insulating layer 2 located in the window 3 need not necessarily be removed in the case where the insulating layer 2 is sufficiently thin to allow an adequate magnetic flux to pass therethrough.

It is also to be noted that the insulating layer 2 need not necessarily be provided in the case where the substrate 1 is made of a magnetic material which is not electrically conductive.

It is further to be noted that the substrate 1 can also be arranged in the form of a thin layer.

Figure 7:
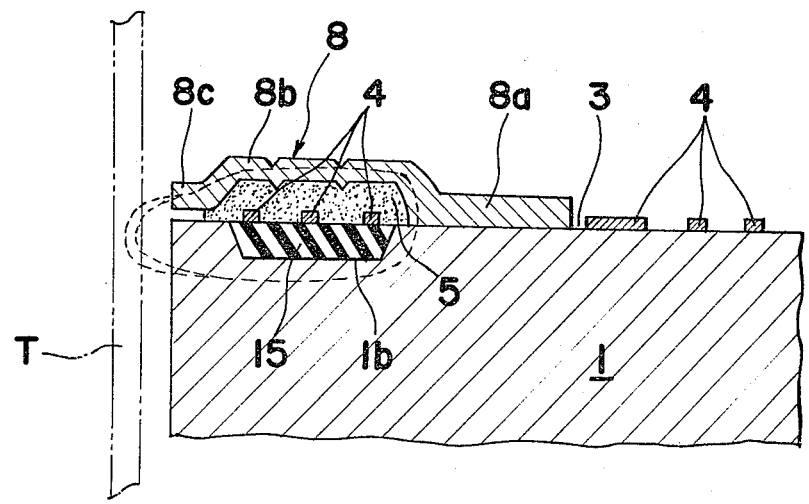
FIG. 7 is a view similar to FIG. 4, but particularly showing another embodiment.

Referring to FIG. 7, there is shown a magnetic head arrangement according to another embodiment of the present invention. The magnetic head arrangement shown has a substrate 1 which is made of magnetic material which is not electrically conductive. Therefore, is this embodiment, no insulating layer 2 is provided. According to this embodiment, the substrate 1 is formed with a groove 1b which extends under a portion where the magnetic layer 8 covers the windings of spiral coil 4. A non-magnetic material 15, such as glass, is filled in the groove 1b so as to magnetically insulate the magnetic layer 8, particularly the intermediate portion 8b, from the substrate 1, thus preventing magnetic flux leakage between the layer 8 and the substrate 1.

The structure of this embodiment is suitable for improving the core efficiency of the magnetic head. Therefore, it is preferable to employ the arrangement of FIG. 7 when the number of windings of the spiral coil 4 is great and the length of each winding is relatively long.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A magnetic head arrangement including a plurality of magnetic head units aligned with a predetermined pitch along a first direction orthogonal to a second direction of movement of a recording medium, each said magnetic head unit comprising:
   a first magnetic layer;
   a first electrically insulating layer in contact with said first magnetic layer;
   an electrically conductive layer formed directly on said first electrically insulating layer, said electrically conductive layer being in the shape of a spiral having a central opening;
   a second electrically insulating layer covering a portion of said spiral which is wider than said central opening;
   a second magnetic layer having a contacting portion within said central opening and in magnetic connection with said first magnetic layer, an intermediate portion located above said portion of said spiral and electrically insulated therefrom by said second electrically insulating layer, and a gap forming portion positioned exteriorly of said spiral and forming with said first magnetic layer a predetermined gap adapted to confront a recording medium;
   said second magnetic layer including said gap forming portion having a width in said first direction greater than the width in said first direction of said central opening; and
   the total length of a border between said contacting portion and said intermediate portion being equal to or greater than the width in said first direction of said gap forming portion.

2. A magnetic head arrangement as claimed in claim 1, wherein at said gap said gap forming portion is separated from said first magnetic layer by said first electrically insulating layer.

3. A magnetic head arrangement including a plurality of magnetic head units aligned with a predetermined pitch along a first direction orthogonal to a second direction of movement of a recording medium, each said magnetic head unit comprising:
   a non-electrically conductive first magnetic layer;
   an electrically conductive layer formed on said first magnetic layer, said electrically conductive layer being in the shape of a spiral having a central opening;
   an electrically insulating layer covering a portion of said spiral which is wider than said central opening;
   a second magnetic layer having a contacting portion within said central opening and in magnetic connection with said first magnetic layer, an intermediate portion located above said portion of said spiral and electrically insulated therefrom by said electrically nsulating layer, and a gap forming portion positioned exteriorly of said spiral and forming with said first magnetic layer a predetermined gap adapted to confront a recording medium;
   said first magnetic layer having formed therein a groove confronting at least said portion of said spiral covered by said electrically insulating layer and said intermediate portion;
   a non-magnetic material filling said groove;
   said second magnetic layer including said gap forming portion having a width in said first direction greater than the width in said first direction of said central opening; and
   the total length of a border between said contacting portion and said intermediate portion being equal to or greater than the width in said first direction of said gap forming portion.

4. A magnetic head arrangement as claimed in claim 3, wherein said non-magnetic material comprises glass.

5. A magnetic head arrangement as claimed in claim 3, wherein said gap comprises an air gap.

6. A magnetic head arrangement as claimed in claim 1 or claim 3, wherein said width of said second magnetic layer is substantially uniform throughout the entire length thereof in a third direction perpendicular to said first and second directions.

7. A magnetic head arrangement as claimed in claim 1 or claim 3, wherein said contacting portion is in the shape of a rectangle with two long sides and two short sides, said border comprises said two long sides and one said short side, and each said long side has a length equal to or greater than half said width of said gap forming portion.

* * * * *